United States Patent
Hornsby et al.

(10) Patent No.: US 6,553,209 B1
(45) Date of Patent: Apr. 22, 2003

(54) UPSTREAM/DOWNSTREAM LOCAL OSCILLATOR METHODS AND STRUCTURES FOR WIRELESS COMMUNICATION SYSTEM TRANSCEIVERS

(75) Inventors: James J. Hornsby, Newbury Park, CA (US); Kris Kelkar, Camarillo, CA (US)

(73) Assignee: California Amplifier, Inc., Camarillo, CA (US)

( * ) Notice: Subject to any disclaimer, the term of this patent is extended or adjusted under 35 U.S.C. 154(b) by 380 days.

(21) Appl. No.: 09/655,497

(22) Filed: Sep. 5, 2000

Related U.S. Application Data
(60) Provisional application No. 60/204,724, filed on May 16, 2000.

(51) Int. Cl.[7] ................................................. H04B 1/40
(52) U.S. Cl. ........................ 455/76; 455/260; 375/376
(58) Field of Search ............................ 455/76, 73, 84, 455/265, 264, 260, 259; 375/362, 373, 376; 331/2, 18, 25, 34, 46, 47

(56) References Cited

U.S. PATENT DOCUMENTS

| | | | |
|---|---|---|---|
| 5,450,447 A | 9/1995 | Dutta | 375/344 |
| 5,574,986 A | * 11/1996 | Mobach | 455/76 |
| 5,794,119 A | * 8/1998 | Evans et al. | 455/3.05 |
| 5,828,709 A | 10/1998 | Lee | 375/344 |
| 5,956,375 A | 9/1999 | Kanterakis | 375/326 |

* cited by examiner

Primary Examiner—Nguyen T. Vo
(74) Attorney, Agent, or Firm—Koppel, Jacobs, Patrick & Heybl (57) ABSTRACT

Local-oscillator systems for wireless communication systems are realized with oscillator networks that are phase locked to a bit timing clock. Two of the networks provide first and second phase coherent local-oscillator signals respectively to a receiver and transmitter of a transceiver. A third oscillator system forms a phase lock loop about one of the other networks and preferably includes a crystal to enhance short term stability. Because they track the bit timing clock, the first and second local-oscillator signals phase track all communication signals in the transceiver's communication system.

22 Claims, 6 Drawing Sheets

UPSTREAM/DOWNSTREAM LOCAL OSCILLATOR METHODS AND STRUCTURES FOR WIRELESS COMMUNICATION SYSTEM TRANSCEIVERS

CROSS REFERENCES TO RELATED APPLICATIONS

This application claims the benefit of U.S. Provisional Application Ser. No. 60/204,724 filed May 16, 2000.

BACKGROUND OF THE INVENTION

1. Field of the Invention

The present invention relates generally to wireless communication systems and, more particularly, to wireless communication system transceivers.

2. Description of the Related Art

Conventional local oscillators for communication systems, whether wireless or otherwise, have typically been realized with a) oven-controlled crystal oscillators or b) voltage-controlled oscillators with Costas loops in order to maintain precise (e.g., nanosecond accuracy) timing of local oscillator signals for upstream and downstream applications. Although these local-oscillator structures can generate suitable downconverting and upconverting signals, they are generally expensive. In addition, they are typically large so that they consume an undue amount of circuit board real estate.

SUMMARY OF THE INVENTION

The present invention is directed to small, inexpensive local-oscillator systems that provide stable, phase coherent local-oscillator signals for conversion of downstream communication signals to downstream data signals and a corresponding bit timing clock and conversion of upstream data signals to upstream communication signals.

Local-oscillator systems of the invention are realized with oscillator networks that are phase locked to the bit timing clock. Two of the networks provide first and second phase coherent local-oscillator signals respectively to a receiver and transmitter of a communication transceiver. A third oscillator system forms a phase lock loop about one of the other networks and preferably includes a crystal to enhance short term stability.

Because they track the phase of the bit timing clock, the frequencies of the first and second local-oscillator signals have fixed relationships to the frequency of the bit timing clock and because the bit timimg clock is derived from downstream communication signals that originate in a communication system's head end, the first and second local-oscillator signals insure phase coherency between the upstream and downstream communication signals.

Local-oscillator methods are also provided and communication systems are shown that include the local-oscillator systems.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
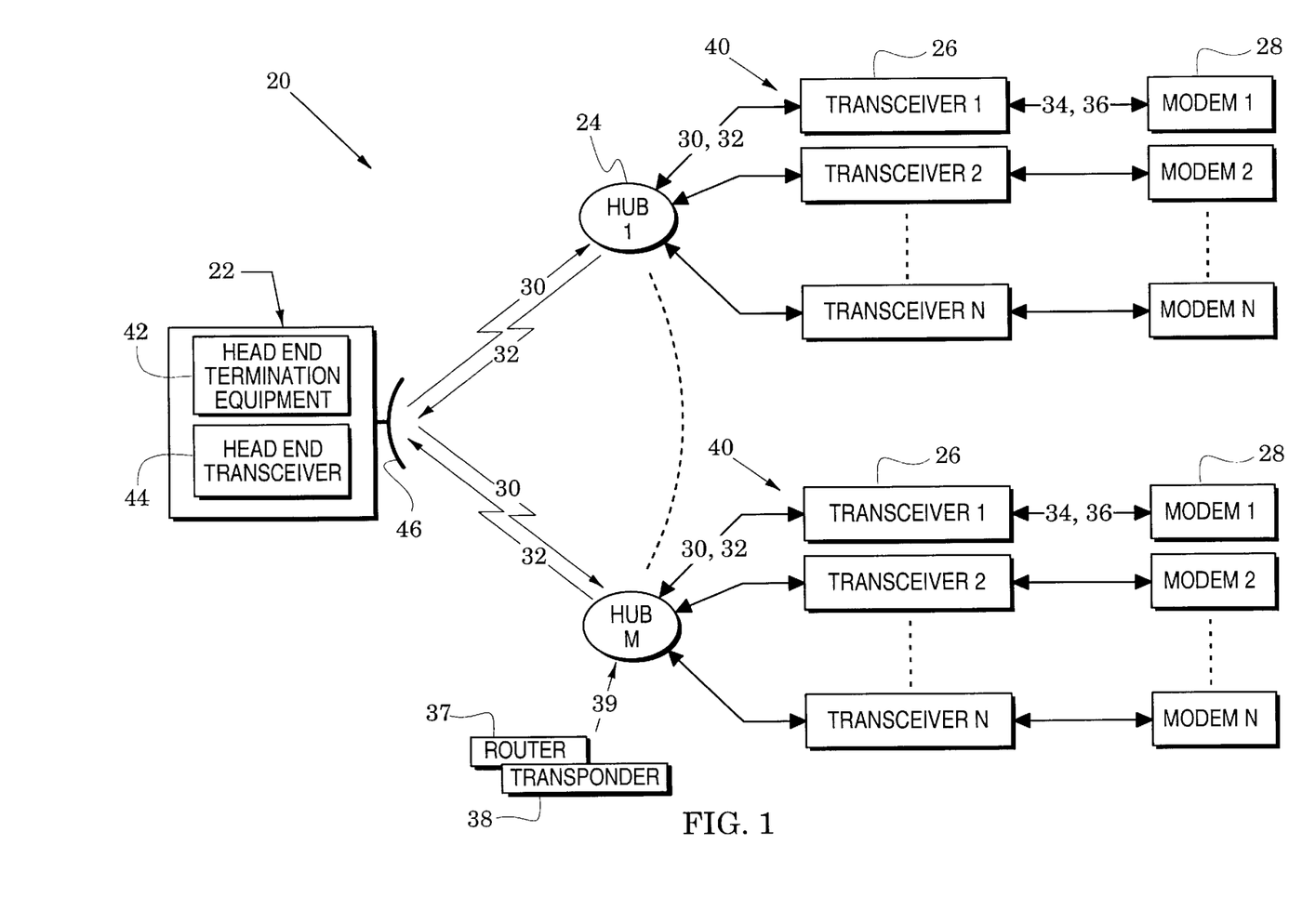
FIG. 1 is a block diagram of a wireless communication system of the present invention.
Figure 2:
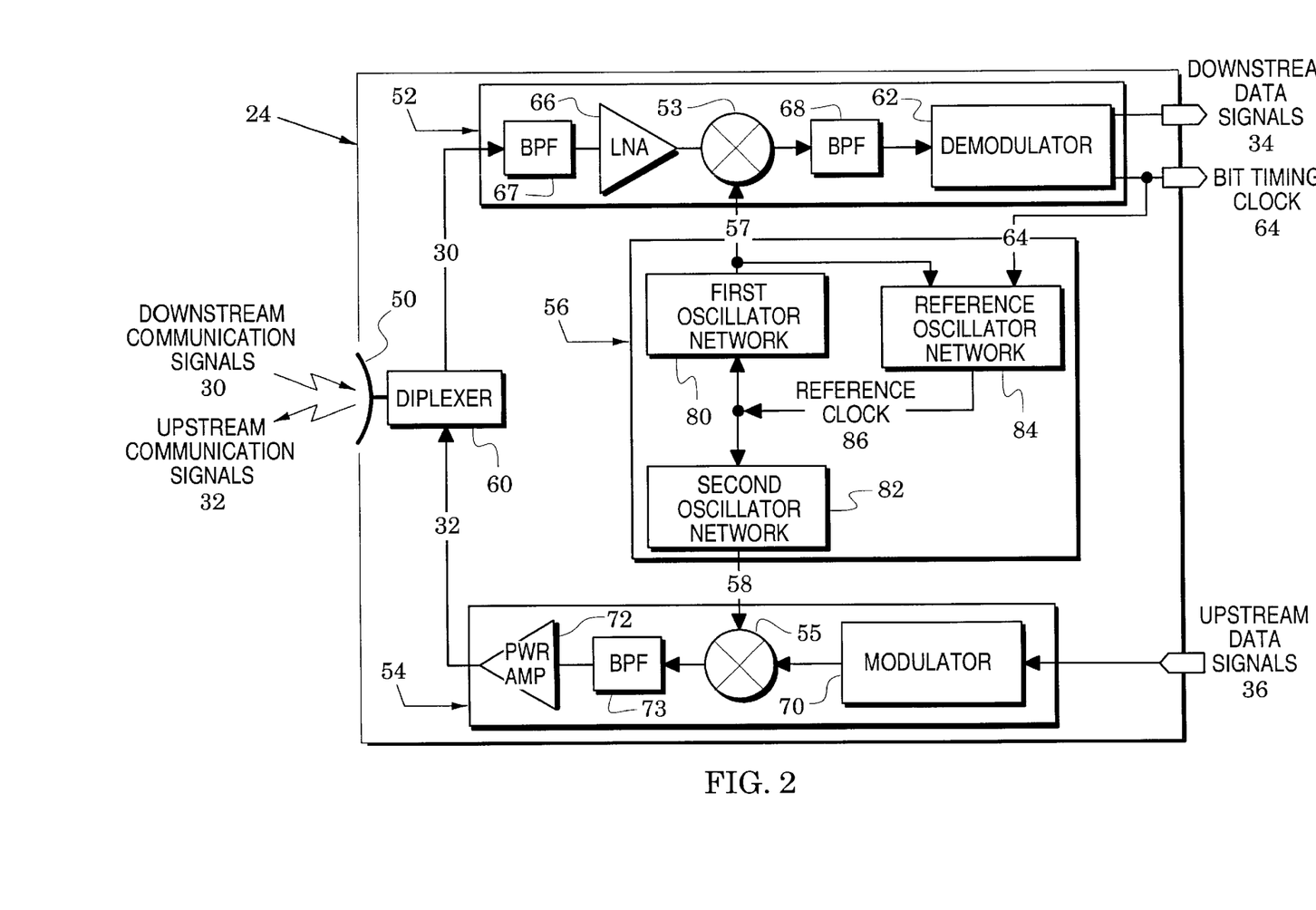
FIG. 2 is a block diagram of a transceiver of FIG. 1.
Figure 3:
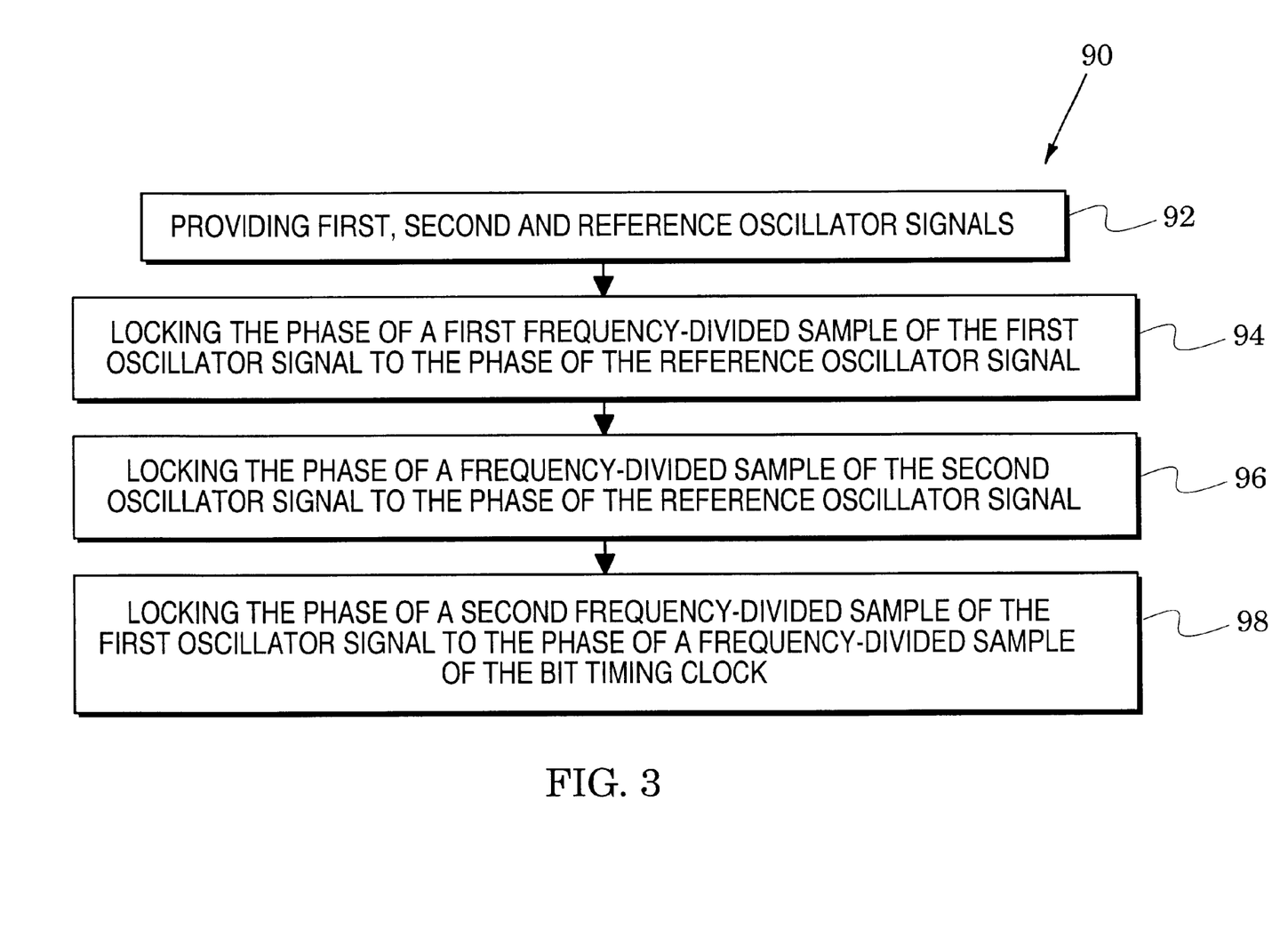
FIG. 3 is a flow diagram that recites process steps that are performed by a local-oscillator system of the transceiver of FIG. 2.
Figure 4:
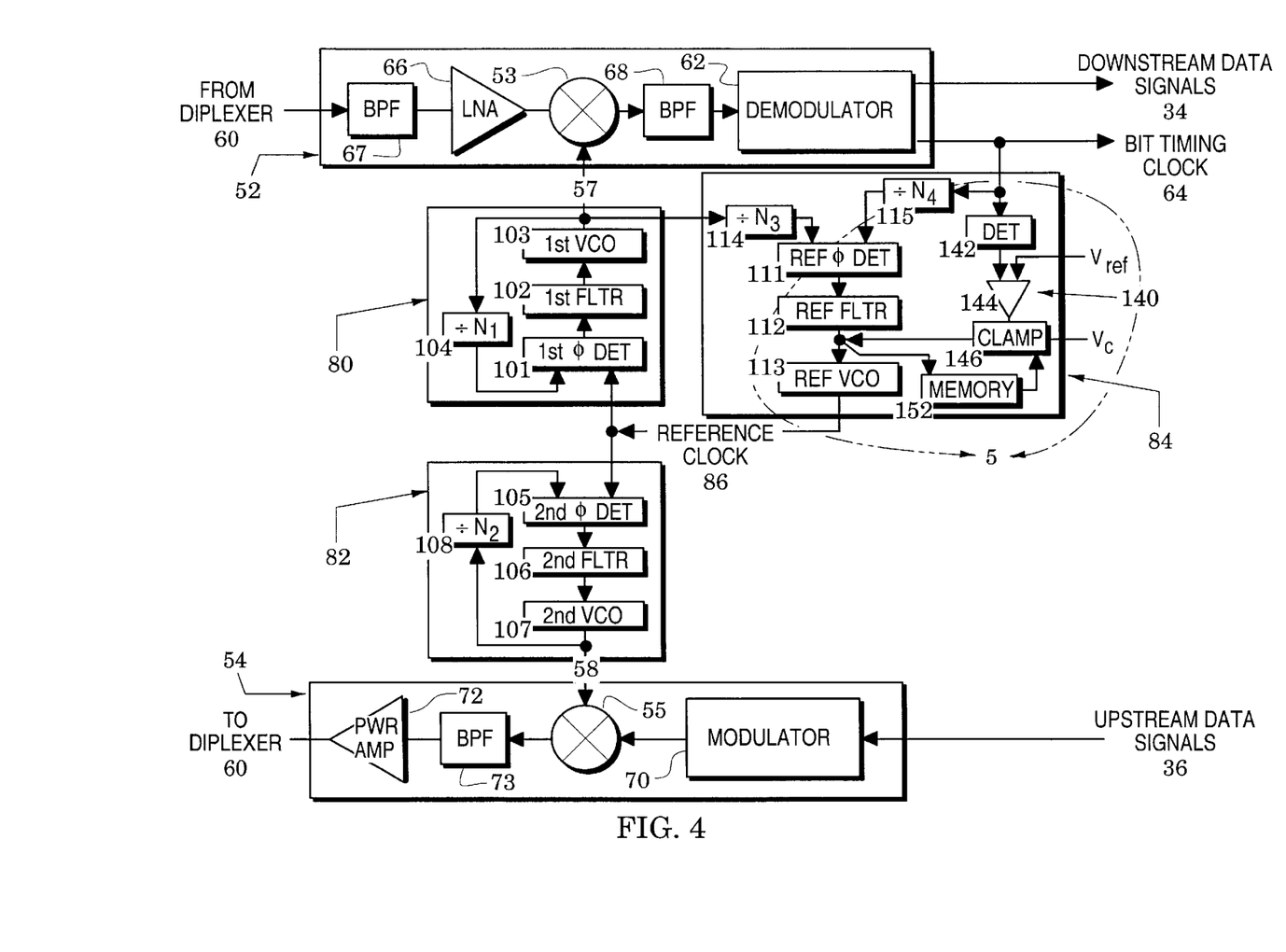
FIG. 4 is a block diagram that includes an embodiment of the local-oscillator system of FIG. 2.

FIGS. 1 and 2 respectively illustrate a communication system of the present invention and a transceiver of this system. FIG. 3 illustrates process steps of a method of the invention that are realized with a local-oscillator system of the transceiver of FIG. 2 and FIG. 4 illustrates another embodiment of this local-oscillator system. The local-oscillator methods and systems of the invention realize stable and phase coherent local-oscillator signals while substantially reducing the cost and size of conventional systems.

In particular, FIG. 1 shows a communication system 20 that includes a communication head end 22, a plurality of communication hubs 24 and a plurality of transceivers 26 that each interface with a customer premises equipment (CPE) such as a modem 28. The head end 22 originates and transmits downstream communication signals 30 (e.g., programming and internet data) and receives upstream communication signals 32.

The transceivers 26 convert the downstream communication signals to downstream data signals 34 for their respective modems 28. System users of the modems receive the downstream data signals 34 and generate upstream data signals 36 which are converted to the upstream communication signals 32 by the transceivers 26.

Each of the communication hubs 24 includes signal steering devices such as a router 37 and at transponder 38 (as indicated by inclusion arrow 39) that relays the downstream communication signals 30 and upstream communication signals 32 between the head end 22 and a respective set 40 of the transceivers 26. The head end includes conventional termination equipment 42 (e.g., satellite receiving antennas and equipment that performs communication functions such as remodulation, timing, gateway access, and message tracking and control) and at least one transceiver 44 that couples the termination equipment 42 to at least one head end antenna 46. The system 20 provides various data signals (e.g., television and internet signals) to users of the CPE modems 28.

FIG. 2 shows that a transceiver 24 of FIG. 1 includes an antenna 50, a receiver 52, a transmitter 54 and a local-oscillator system 56. The receiver includes a downconverter mixer 53, the transmitter includes an upconverter mixer 55 and the local-oscillator system 56 provides phase coherent first and second local-oscillator signals 57 and 58 to respective mixers 53 and 55. The downstream and upstream communication signals 30 and 32 (of FIG. 1) are communicated via an antenna 50 and respectively steered through a diplexer 60 to the receiver 52 and from the transmitter 54.

With its downconverter mixer 53 and in response to the first local-oscillator signal 57, the receiver 52 generates downconverted communication signals and passes them to a demodulator 62 of the receiver. The demodulator converts the downconverted communication signals to downstream data signals 34 and extracts a corresponding bit timing clock 64 (which is also coupled to a respective modem (28 in FIG. 1)). The receiver 52 also includes serially-arranged low-noise amplifier 66 and bandpass filter 67 that respectively amplify and filter the downstream communication signals 30 and a bandpass filter 68 that filters the downconverted communication signals.

The transmitter 54 includes a modulator 70 that converts the upstream data signals 36 to upconverted data signals. With its upconverter mixer 55 and in response to the second local-oscillator signal 58, the transmitter 54 then generates the upstream communication signals 32 and passes them to the antenna 50 via the diplexer 60. The transmitter 54 also includes a power amplifier 72 and bandpass filter 73 that respectively amplify and filter the upstream communication signals 32.

The demodulator 62 of the receiver 52 and the modulator 70 of the transmitter 54 are especially configured to demodulate and modulate any of various signal modulations (e.g., quadrature phase shift keying (QPSK) or N (e.g., 4, 16, 32 and so on) quadrature amplitude modulation (QAM)) that have been chosen for the communication system (20 in FIG. 1). Such demodulators and modulators are conventional and may be obtained from various sources.

As stated above, the local-oscillator system 56 provides phase coherent first and second local-oscillator signals 57 and 58 to respective mixers 53 and 55. In particular, the local-oscillator system includes a first oscillator network 80, a second oscillator network 82 and a reference oscillator network 84. The first and second oscillator networks respectively generate the first and second local-oscillator signals 57 and 58 in response to a reference clock 86. This latter signal is generated by the reference oscillator network 84 in response to the first local-oscillator signal 57 and to the bit timing clock 64.

Functional operation of the local-oscillator system 56 may be described with reference to the process steps of a method 90 of the invention that is illustrated in FIG. 3. These process steps will, in turn, be subsequently described with reference to FIG. 4 which illustrates an embodiment of the local-oscillator system 56.

The method 90 of FIG. 3 provides the phase-coherent first and second local-oscillator signals 57 and 58 for respective conversion of downstream communication signals (30 in FIG. 2) to downstream data signals (34 in FIG. 2) and a corresponding bit data clock (64 in FIG. 2) and conversion of upstream data signals (36 in FIG. 2) to upstream communication signals (32 in FIG. 2).

In a first process step 92, first, second and reference oscillator signals are provided. A second process step 94 locks the phase of a first frequency-divided sample of the first oscillator signal to the phase of the reference oscillator signal. In a similar process step 96, the phase of a frequency-divided sample of the second oscillator signal is locked to the phase of the reference oscillator signal. Finally, the phase of a second frequency-divided sample of the first oscillator signal is locked to the phase of a frequency-divided sample of the bit timing clock.

The process steps 92 and 94 cause the phase of the first frequency-divided sample of the first oscillator signal 57 and the phase of the frequency-divided sample of the second oscillator signal 58 to track the phase of the reference oscillator signal. The process step 96 causes the phase of the second frequency-divided sample of the first oscillator signal 57 to track the phase of the frequency-divided sample of the bit timing clock 64. With the process steps 94, 96 and 98, the first and second oscillator signals of step 92 are converted to the phase-coherent first and second local-oscillator signals 57 and 58 of FIG. 2.

Various elements of the transceiver 24 of FIG. 2 are repeated in FIG. 4 with like elements indicated by like reference numbers. In addition, FIG. 4 indicates that the first oscillator network 80 includes a first phase detector 101, a first filter 102 and a first voltage-controlled oscillator 103 which are serially connected. The first phase detector receives the reference clock 86 and the first voltage-controlled oscillator 103 originates the first local-oscillator signal 57. A first frequency divider 104 (e.g., a programmable counter) is coupled to provide a first frequency-divided sample of the first local-oscillator signal 57 to the first phase detector 101.

The second oscillator network 80 includes a similarly-arranged second phase detector 105, a second filter 106 and a second voltage-controlled oscillator 107. The second phase detector receives the reference clock 86 and the second voltage-controlled oscillator 107 originates the second local-oscillator signal 58. A second frequency divider 108 is coupled to provide a frequency-divided sample of the second local-oscillator signal 57 to the second phase detector 105.

In operation of the first oscillator network 80, the first voltage-controlled oscillator 103 originates the first local-oscillator signal 57 and the frequency divider 104 converts this signal to the first frequency-divided sample that is coupled to the first phase detector 101. In response to a phase difference between this sample and the reference clock 86, the phase detector generates a corresponding control voltage which is coupled through the first filter 102 to control the frequency of the first voltage-controlled oscillator 103.

The action of this phase lock loop is such as to reduce the phase difference, i.e., it locks the phase of the frequency-divided sample of the first local-oscillator signal 57 to the phase of the reference clock 86. With its similar elements, the second oscillator system 82 operates in a similar manner. That is, it generates the second local-oscillator signal 58 and phase locks a frequency-divided sample of this signal to the reference clock 86.

The reference oscillator network 84 includes a reference phase detector 111, a reference filter 112 and a reference voltage-controlled oscillator 113 which are serially connected. A third frequency divider 114 is coupled to provide a second frequency-divided sample of the first local-oscillator signal 57 to the reference phase detector 111. A fourth frequency divider 115 is coupled to provide a frequency-divided sample of the bit timing clock 64 to the reference phase detector 111.

The action of this phase lock loop is to reduce the phase difference at the reference phase detector 111, i.e., it locks the phase of the second frequency-divided sample of the first local-oscillator signal 57 (provided via the frequency divider 114) to the phase of the bit timing clock 64 (provided via the frequency divider 115). It is apparent that the first oscillator network 80 is part of the phase lock loop that begins and ends at the reference voltage-controlled oscillator 113.

Thus, the first oscillator network 82 phase locks the first local-oscillator signal 57 to the reference clock 86 and the second oscillator network 84 phase locks the second local-oscillator signal 58 to the reference clock 86 and the reference oscillator network 84 phase locks the second frequency-divided sample of the first local-oscillator signal 57 to the bit timing clock 64. It is apparent, therefore that a) the frequencies of the first and second local-oscillator signals 57 and 58 have fixed relationships (set by the frequency divisions $N_1$, $N_2$, $N_3$ and $N_4$) to the frequency of the bit timing clock 64, and b) the first and second local-oscillator signals 57 and 58 are phase coherent with the bit timing clock 64.

Figure 5:
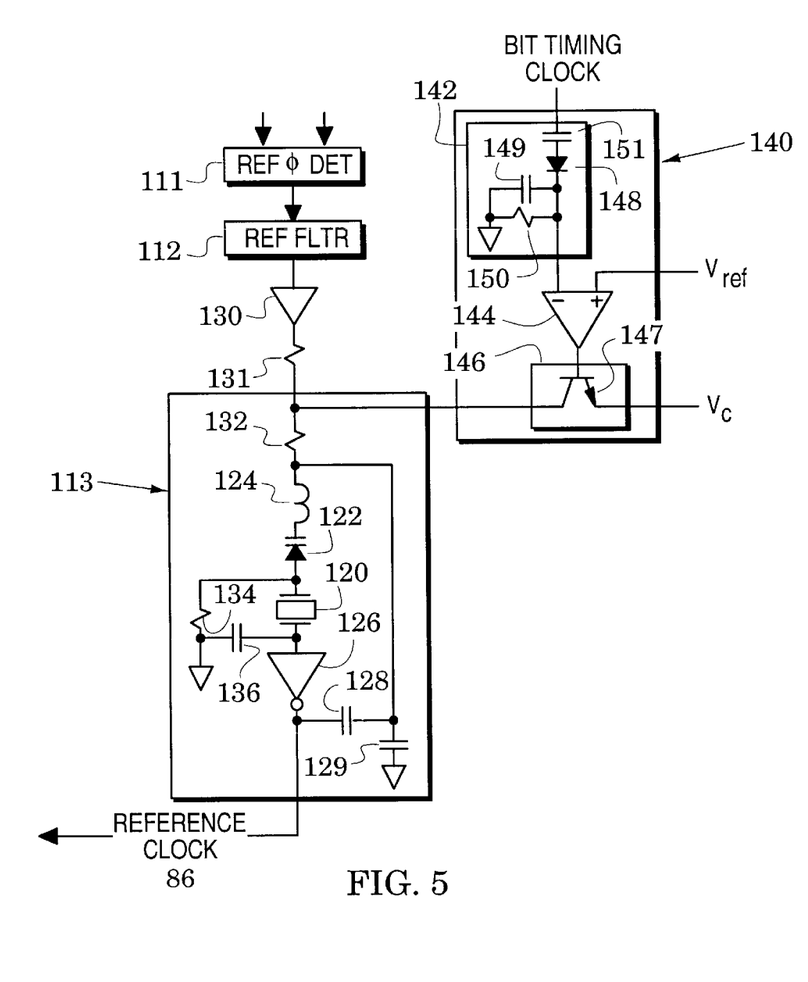
FIG. 5 is a schematic of elements within the curved line 5 of FIG. 4.

All of the voltage-controlled oscillators have resonant circuits that respond to their respective control voltages but that of the reference voltage-controlled oscillator 113 preferably includes a crystal. For example, FIG. 5 illustrates an embodiment of the reference voltage-controlled oscillator 113 in which a resonant circuit (i.e., a tank) is formed with serially-connected crystal 120, varicap 122 (a voltage-controlled capacitance) and inductor 124. The oscillator gain element is an inverter 126 which originates the reference clock 86.

A sample of the reference clock is formed by a capacitive divider (capacitors 128 and 129) and is fed back through the resonant circuit to the input of the inverter 126. The reference phase detector 111 and reference filter 112 (of FIG. 4) communicate (via an amplifier 130 and isolation resistors 131 and 132) the control voltage to the varicap 122 so as to tune the resonance of the resonant circuit. A resistor 134 provides a ground bias to the opposite side of the varicap 122 and a stability capacitor 136 shunts the input of the inverter 126. The oscillator structure of FIG. 5, less the crystal 120, can also be used to realize the first and second voltage-controlled oscillators (80 and 82 in FIG. 4).

In an exemplary realization of the invention, the bit timing clock 64 of FIG. 4 has a frequency of 20 MHz and the division $N_4$ of the fourth frequency divider 115 is set to 20 so that the frequency-divided sample to the reference phase detector 111 has a frequency of 1 MHz. The division $N_3$ of the third frequency divider 114 is set to 2278 so that the first oscillator signal 57 has a frequency of 2278 MHz. The signals at the reference phase detector 111 are thus essentially 1 microsecond pulses.

The division $N_1$ of the frequency divider 104 is set to 64 so that the reference clock 86 has a frequency of ~35.59375 MHz which is thereby the resonance of the crystal 120 of FIG. 5. Finally, the division $N_2$ of the frequency divider 108 is set to 62 so that the second oscillator signal 58 has a frequency of 2206.8125 MHz.

In this exemplary realization, the frequency of the downstream communication signals (30 in FIG. 2) can be positioned in the multichannel multipoint distribution service (MMDS) band of 2500–2684 MHz. In this case, the input frequencies to the demodulator 62 would be in the range of 222–406 MHz. If the modulator 70 delivers signals in the range of 44.8125–56.8125 MHz and the difference between the upstream data signals 36 and the second local-oscillator signal 58 is passed through the bandpass filter 73, the upstream communication signals (32 in FIG. 2) are positioned in the multipoint distribution service (MDS) band of 2150–2162 MHz.

Various conventional modulators and demodulators are available for operation in the ranges of this exemplary realization (they convert between these bands and the basebands of the upstream and downstream data signals 34 and 36). The frequency dividers 104, 108, 114 and 115 of FIG. 4 are preferably programmable dividers to facilitate modification of this example to other operational frequency bands. This programming may be achieved via command signals from the head end (22 in FIG. 1).

From the above description, it is apparent that the local-oscillator system of FIG. 4 supplies phase-coherent first and second local-oscillator signals 57 and 58 which provide short and long-term stability to the receiver 52 and transmitter 54. The bit timing clock is derived from the downstream communication signals (and, thereby, from the head end (22 in FIG. 1)). It initiates minor (e.g., <100 ppm) adjustments in the frequency of the reference voltage-controlled oscillator 113 to thereby maintain phase coherence with the communication system and to insure that phase cycles match over the long term (e.g., >1 second).

Accordingly, the first and second local-oscillator signals 57 and 58 are phase synchronized to the signals of the entire communication system (20 in FIG. 1). Short term stability (e.g., <1 microsecond) is provided by the crystal (120 in FIG. 5) of the reference voltage-controlled oscillator 113.

The reference oscillator system 84 of FIG. 4 has a predetermined acquisition range and will automatically lock onto the bit timing clock 64 as long as the clock is within this acquisition range. This is assured with a clamp generation circuit 140 which applies a clamp voltage to the reference voltage-controlled oscillator 113 when the bit timing clock is absent (e.g., due to a break in transmission of the downstream communication signals (30 in FIG. 1)).

The circuit 140 includes a detector 142 whose output drops below a reference voltage $V_{ref}$ in the absence of the bit timing clock 64. In response, a comparator 144 activates a clamp 146 which acts as a switch to apply a clamp voltage $V_c$ to the reference voltage-controlled oscillator 113. The clamp voltage is selected so that the frequency of the oscillator approximates that of the bit timing clock 64. When the bit timing clock resumes, it will therefore be within the acquisition range and the reference voltage-controlled oscillator 113 will automatically lock to it.

In the embodiment of FIG. 5, the clamp 146 is a bipolar junction transistor 147 whose base is coupled to the comparator 144. The detector 142 has a detection diode 148 coupled to an RC time constant circuit formed by parallel-connected capacitor 149 and resistor 150. The diode 148 is ac-coupled to the bit timing clock by a capacitor 151. The reference voltage $V_{ref}$ and the clamp voltage $V_c$ may be provided by a source (e.g., a digital-to-analog converter driven by a microprocessor) which can vary them to enhance system operation.

In another clamp embodiment that is shown in FIG. 4, the control voltage of the reference voltage-controlled oscillator 113 is stored in a memory 152 when the bit timing clock is present. In the absence of the bit timing clock 64, the stored control voltage forms the clamp voltage $V_c$ and is applied to the reference voltage-controlled oscillator via the clamp 146.

Figures 6, 7:
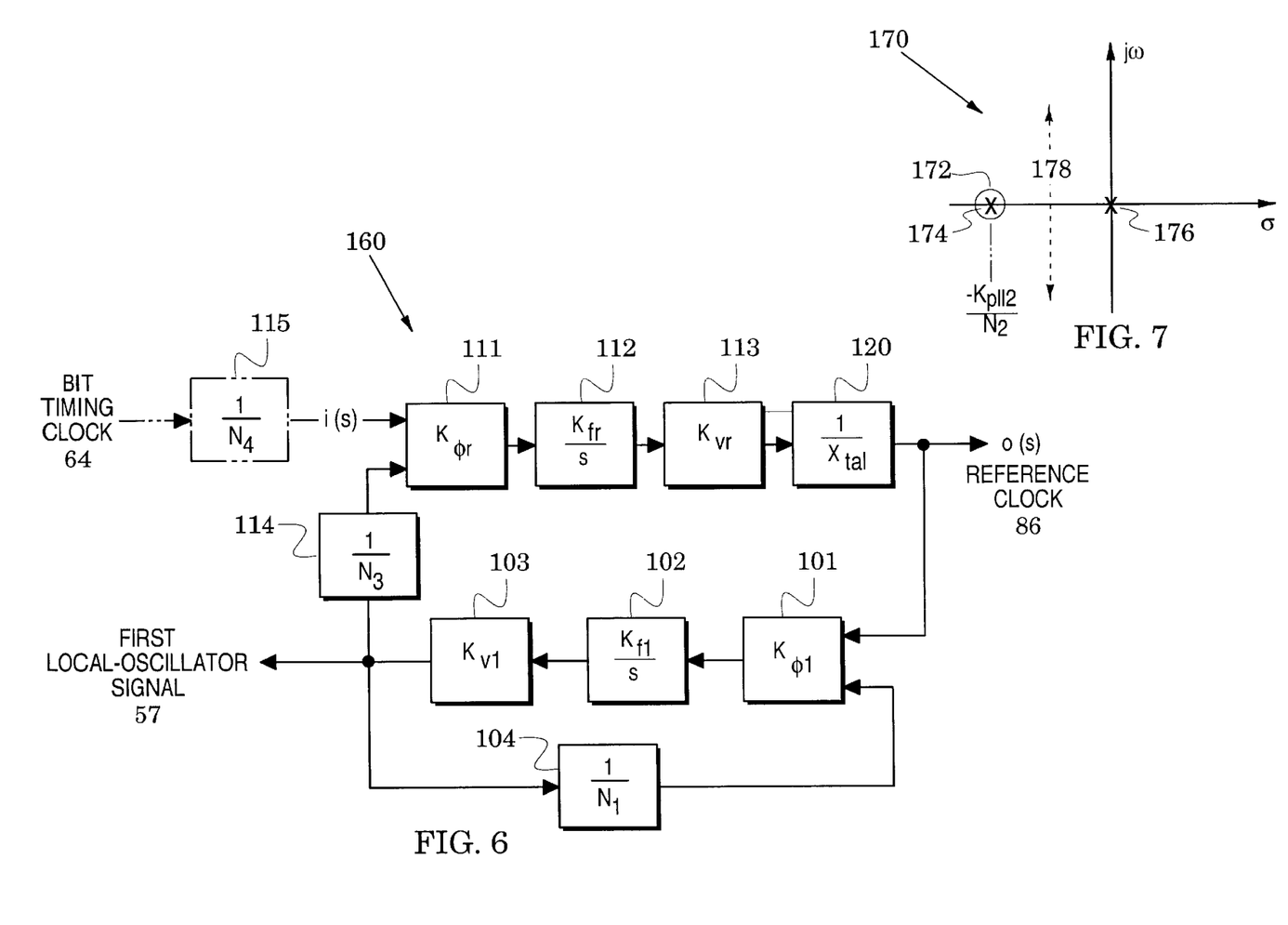
FIG. 6 is a transfer-function diagram of elements of the local-oscillator system of FIG. 4 with concomitant gains in mathematical terms.
FIG. 7 is pole-zero plot of the transfer function of FIG. 6.

The stability of the local-oscillator system of FIG. 4 is explored in the equivalent circuit 160 of FIG. 6. This diagram illustrates a transfer function o(s)/i(s) wherein the input i(s) is the frequency-divided sample of the bit timing clock 64 at the output of the frequency divider 115 and the output o(s) is the reference clock 86 at the output of the reference voltage-controlled oscillator 113.

The transfer function 160 of FIG. 6 thus includes the elements of the reference oscillator network 84 and the first oscillator network 80. As previously noted, the elements of the first oscillator network 80 are contained within the phase lock loop that begins and ends at the reference voltage-controlled oscillator (113 in FIG. 4). The individual transfer functions are indicated by the reference numbers of their respective elements in FIG. 4.

In FIG. 6, the transfer functions of the reference phase detector 111 and the first phase detector 101 are their respective gains $K_{\phi r}$ and $K_{\phi 1}$ (expressed in volts/radian). The reference filter 112 and first filter 102 are assumed to be low-pass filters (i.e., integrators with a single pole) so that their transfer functions are $K_{f r}/s$ and $K_{f 1}/s$ wherein $K_{f 1}$ and $K_{f 1}$ are the gains of these filters (and any associated amplifier gain).

The transfer functions of the reference voltage-controlled oscillator 113 and the first voltage-controlled oscillator 103 are their respective gains $K_{v r}$ and $K_{v 1}$ (expressed in radians/second/volt). The gain of the reference voltage-controlled oscillator 113, however, is attenuated several orders of magnitude by the crystal 120 of its tank circuit and this effect is accommodated by modifying the gain $K_{v r}$ to $K_{v r}/X_{tal}$ wherein $1/X_{tal}$ represents the crystal attenuation.

The transfer functions of the first, third and fourth frequency dividers 104, 114 and 115 are $1/N_1$, $1/1N_3$ and $1/N_4$ (wherein $N_1$, $N_3$ and $N_4$ are the division numbers of the frequency dividers). The fourth frequency divider, however, is not part of the transfer function $o(s)/i(s)$.

The transfer function of the equivalent circuit 160 of FIG. 6 is therefore given by the expressions $$\frac{o(s)}{i(s)} = \frac{k_{\phi r} k_{f r} k_{v r} \frac{1}{x_{tal}}}{1 + \left\{ \frac{k_{\phi 1} k_{f 1} k_{v 1}}{N_3 \left( \frac{s + k_{\phi 2} k_{f 2} k_{v 2}}{N_2} \right)} \frac{k_{\phi r} k_{f r} k_{v r}}{x_{tal}^2} \right\}} \quad (1)$$

$$\frac{o(s)}{i(s)} = \frac{k_{\phi r} k_{f r} k_{v r}}{x_{tal}^2 + \frac{N_2 k_{\phi 1} k_{f 1} k_{v 1} k_{\phi r} k_{f r} k_{v r}}{N_3 (N_2 s + k_{\phi 1} k_{f 1} k_{v 1})}} \quad (2)$$

in which the Laplace operator $s = \sigma + j\omega$. These expressions can be simplified with the identities $$k_{pllr} = k_{\omega_r} k_{f r} k_{v r}$$

$$k_{pll1} = k_{\omega_1} k_{f 1} k_{v 1}$$

$$x_{tal} = N_{xtal} \quad (3)$$

to the expressions $$\frac{o(s)}{i(s)} = \frac{k_{pllr}}{N_{xtal} s + \frac{N_2 k_{pllr} k_{pll1}}{N_3 (N_2 s + k_{pll1})}} \quad (4)$$

$$\frac{o(s)}{i(s)} = \frac{N_3 k_{pllr} \left( s + \frac{k_{pll1}}{N_2} \right)}{N_{xtal} N_3 s \left( s + \frac{k_{pll1}}{N_2} \right) + k_{pllr} k_{pll1}}. \quad (5)$$

Equation (5) is plotted in the pole-zero plot 170 of FIG. 7. The parenthetical expressions in the numerator and denominator of equation (5) respectively represent a zero 172 and a pole 174 located at $-k_{pll2}/N_2$ on the real axis $\sigma$. The single s (the Laplace operator $s = \sigma + j\omega$) in the denominator represents a zero 176 at the origin.

Thus, the solution set of equation (5) has the form $o(s)/i(s) = k_r \sigma + k_i j\omega$ wherein the real coefficient $k_r$ varies between $-k_{pll2}/N_2$ and zero and the imaginary coefficient $k_i$ varies between ± infinity as indicated by the broken line arrow 178. Because the poles of equation (5) lie on the left-hand side of the s-plane, the transfer function $o(s)/i(s)$ of the equivalent circuit 160 of FIG. 6 exhibits unconditional stability.

Transceiver methods and structures have been described which provide stable and phase coherent local-oscillator signals and which substantially reduce the cost and size of conventional local-oscillator systems. Customer premises equipment has been exemplarized in FIG. 1 with modems 28 but such equipment typically includes various other modules (e.g., television sets and computers). It is to be understood that each occurrence of M and N in FIG. 1 may represent a different integer.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of providing phase-coherent first and second local-oscillator signals for respective conversion of downstream communication signals to downstream data signals and a corresponding bit data clock and conversion of upstream data signals to upstream communication signals, said method comprising the steps of:

providing first, second and reference oscillator signals;

locking the phase of a first frequency-divided sample of said first oscillator signal to the phase of said reference oscillator signal;

locking the phase of a frequency-divided sample of said second oscillator signal to the phase of said reference oscillator signal; and locking the phase of a second frequency-divided sample of said first oscillator signal to the phase of a frequency-divided sample of said bit timing clock;

said first and second oscillator signals thereby converted to said phase-coherent first and second local-oscillator signals.

2. The method of claim 1, further including the steps of:

sensing an absence of said bit timing clock; and maintaining the frequency of said reference oscillator signal substantially as it was prior to said absence.

3. The method of claim 1, wherein:

said providing step includes the step of generating said first local-oscillator signal with a first voltage-controlled oscillator; and the first locking step includes the step of coupling, to said first voltage-controlled oscillator, a control voltage whose amplitude corresponds to a phase difference between said first frequency-divided sample of said first local-oscillator signal and said reference oscillator signal.

4. The method of claim 1, wherein:

said providing step includes the step of generating said second local-oscillator signal with a second voltage-controlled oscillator; and the second locking step includes the step of coupling, to said second voltage-controlled oscillator, a control voltage whose amplitude corresponds to a phase difference between said frequency-divided sample of said second local-oscillator signal and said reference oscillator signal.

5. The method of claim 1, wherein:

said providing step includes the step of generating said reference local-oscillator signal with a reference voltage-controlled oscillator; and the third locking step includes the step of coupling, to said reference voltage-controlled oscillator, a control voltage whose amplitude corresponds to a phase difference between said second frequency-divided sample of said first oscillator signal and said frequency-divided sample of said bit timing clock.

6. A local-oscillator system that provides phase-coherent first and second local-oscillator signals for respective conversion of downstream communication signals to downstream data signals and a corresponding bit data clock and conversion of upstream data signals to upstream communication signals, said method comprising the steps of:
- a reference oscillator network that generates a reference clock;
- a first oscillator network that generates said first local-oscillator signal and phase locks a first frequency-divided sample of said first local-oscillator signal to said reference clock; and
- a second oscillator network that generates said second local-oscillator signal and phase locks a frequency-divided sample of said second local-oscillator signal to said reference clock;
- wherein said reference oscillator network phase locks a second frequency-divided sample of said first local-oscillator signal to a frequency-divided sample of said bit timing clock.

7. The system of claim 6, wherein said reference oscillator network includes a reference voltage-controlled oscillator that originates said reference clock; and further including a clamp generator that applies a clamp voltage to said reference voltage-controlled oscillator in response to an absence of said bit timing clock.

8. The system of claim 7, wherein said clamp generation circuit includes:
- a switch that, when activated, couples said clamp voltage to said reference voltage-controlled oscillator;
- a detector that generates a detected signal in response to said bit timing clock; and
- a comparator that activates said switch in the absence of said detected signal and deactivates said switch in response to said detected signal.

9. The system of claim 6, wherein said first oscillator network includes:
- a first voltage-controlled oscillator that originates said first local-oscillator signal;
- a frequency divider that converts said first local-oscillator signal to said first frequency-divided sample of said first local-oscillator signal;
- a phase detector that generates a control voltage in response to a phase difference between said first frequency-divided sample of said first local-oscillator signal and said reference clock; and
- a filter that couples said control voltage to said first voltage-controlled oscillator.

10. The system of claim 6, wherein said second oscillator network includes:
- a second voltage-controlled oscillator that originates said second local-oscillator signal;
- a frequency divider that converts said second local-oscillator signal to said frequency-divided sample of said second local-oscillator signal;
- a phase detector that generates a control voltage in response to a phase difference between frequency-divided sample of said second local-oscillator signal and said reference clock; and
- a filter that couples said control voltage to said second voltage-controlled oscillator.

11. The system of claim 6, wherein said reference oscillator network includes:
- a reference voltage-controlled oscillator that originates said reference local-oscillator signal;
- a first frequency divider that converts said first local-oscillator signal to said second frequency-divided sample of said first local-oscillator signal;
- a second frequency divider that converts said bit timing clock to said frequency-divided sample of said bit timing clock;
- a phase detector that generates a control signal in response to a phase difference between said second frequency-divided sample of said first local-oscillator signal and said frequency-divided sample of said bit timing clock; and
- a filter that couples said control signal to said reference voltage-controlled oscillator.

12. A communications transceiver that converts downstream communication signals to downstream data signals and a corresponding bit data clock and converts upstream data signals to upstream communication signals, comprising:
- a receiver that has a downconverter mixer and generates downconverted communication signals in response to said downstream communication signals and to a first local-oscillator signal that is applied to said downconverter mixer;
- a demodulator in said receiver that generates said downstream data signals and a corresponding bit timing clock in response to said downconverted communication signals;
- a transmitter having a modulator that generates modulated signals in response to said upstream data signals and wherein said transmitter has an upconverter mixer and generates said upstream communication signals in response to said modulated signals and a second local-oscillator signal that is applied to said upconverter mixer; and
- a local-oscillator system that includes:
  a) a reference oscillator network that generates a reference clock;
  b) a first oscillator network that generates said first local-oscillator signal and phase locks a first frequency-divided sample of said first local-oscillator signal to said reference clock; and
  c) a second oscillator network that generates said second local-oscillator signal and phase locks a frequency-divided sample of said second local-oscillator signal to said reference clock;
- wherein said reference oscillator network phase locks a second frequency-divided sample of said first local-oscillator signal to a frequency-divided sample of said bit timing clock;
- said first and second local-oscillator signals thereby being phase coherent.

13. The transceiver of claim 12, wherein said reference oscillator network includes a reference voltage-controlled oscillator that originates said reference clock; and further including a clamp generator that applies a clamp voltage to said reference voltage-controlled oscillator in response to an absence of said bit timing clock.

14. The transceiver of claim 12, wherein said first oscillator network includes:
- a first voltage-controlled oscillator that originates said first local-oscillator signal;

a frequency divider that converts said first local-oscillator signal to said first frequency-divided sample of said first local-oscillator signal;

a phase detector that generates a control voltage in response to a phase difference between said first frequency-divided sample of said first local-oscillator signal and said reference clock; and a filter that couples said control voltage to said first voltage-controlled oscillator.

15. The transceiver of claim 12, wherein said second oscillator network includes:

a second voltage-controlled oscillator that originates said second local-oscillator signal;

a frequency divider that converts said second local-oscillator signal to said frequency-divided sample of said second local-oscillator signal;

a phase detector that generates a control voltage in response to a phase difference between said frequency-divided sample of said second local-oscillator signal and said reference clock; and a filter that couples said control voltage to said second voltage-controlled oscillator.

16. The transceiver of claim 12, wherein said reference oscillator network includes:

a reference voltage-controlled oscillator that originates said reference local-oscillator signal;

a first frequency divider that converts said first local-oscillator signal to said second frequency-divided sample of said first local-oscillator signal;

a second frequency divider that converts said bit timing clock to said frequency-divided sample of said bit timing clock;

a phase detector that generates a control signal in response to a phase difference between said second frequency-divided sample of said first local-oscillator signal and said frequency-divided sample of said bit timing clock; and a filter that couples said control signal to said reference voltage-controlled oscillator.

17. The transceiver of claim 12, wherein said receiver includes:

a low-noise amplifier that amplifies said downstream communication signals; and a bandpass filter coupled in series with said low-noise amplifier.

18. The transceiver of claim 12, wherein said transmitter includes:

a power amplifier that amplifies said upstream communication signals; and a bandpass filter coupled between said upconverter mixer and said power amplifier.

19. The transceiver of claim 12, further including:

an antenna; and a diplexer that couples said downstream communication signals from said antenna to said downconverter and couples said upstream communication signals from said upconverter to said antenna.

20. A communications system, comprising:

a head end that originates and transmits downstream communication signals and receives upstream communication signals;

a plurality of transceivers that receive said downstream communication signals and transmit said upstream communication signals; and at least one communication hub that includes at least one transponder that relays said downstream and upstream communication signals between said head end and a respective set of said transceivers;

wherein each of said transceivers includes:

a receiver that has a downconverter mixer and generates downconverted communication signals in response to said downstream communication signals and to a first local-oscillator signal that is applied to said downconverter mixer;

a demodulator in said receiver that generates said downstream data signals and a corresponding bit timing clock in response to said downconverted communication signals;

a transmitter having a modulator that generates modulated signals in response to said upstream data signals and wherein said transmitter has an upconverter mixer and generates said upstream communication signals in response to said modulated signals and a second local-oscillator signal that is applied to said upconverter mixer; and a local-oscillator system that includes:
  a) a reference oscillator network that generates a reference clock;
  b) a first oscillator network that generates said first local-oscillator signal and phase locks a first frequency-divided sample of said first local-oscillator signal to said reference clock; and
  c) a second oscillator network that generates said second local-oscillator signal and phase locks a frequency-divided sample of said second local-oscillator signal to said reference clock; and wherein said reference oscillator network phase locks a second frequency-divided sample of said first local-oscillator signal to a frequency-divided sample of said bit timing clock.

21. The system of claim 20, wherein said reference oscillator network includes a reference voltage-controlled oscillator that originates said reference clock; and further including a clamp generator that applies a clamp voltage to said reference voltage-controlled oscillator in response to an absence of said bit timing clock.

22. The system of claim 20, wherein said head end includes:

termination equipment that originates said downstream communication signals and receives upstream communication signals; and at least one transceiver that transmits said downstream communication signals and receives said upstream communication signals.

* * * * *